UNITED STATES PATENT OFFICE.

EDWARD J. FUCHS, OF SCRANTON, PENNSYLVANIA.

PROCESS OF MAKING FERTILIZER FROM LEATHER SCRAP.

No. 841,501.      Specification of Letters Patent.      Patented Jan. 15, 1907.

Application filed March 12, 1906. Serial No. 305,714.

*To all whom it may concern:*

Be it known that I, EDWARD J. FUCHS, a citizen of the United States, and a resident of Scranton, in the county of Lackawanna and State of Pennsylvania, have invented certain new and useful Improvements in Processes of Making Fertilizer from Leather Scrap, of which the following is a full, clear, and exact description.

My invention relates to the material known as "ammoniate fertilizer," which is made from the scraps and refuse portions of vegetable-tanned leather. This ammoniate is employed mainly in the manufacture of fertilizers.

The great objection heretofore made to ammoniates produced from such leather is the fact that they contain tannin and also much unavailable ammonia. The presence of a comparatively small amount of tannin renders such ammoniates undesirable and difficult of sale in general and absolutely worthless in many States, where local agricultural laws provide heavy money fines and imprisonment for manufacturers and dealers offering for sale fertilizers containing even traces of tannin. By so preparing the ammoniate that it contains no tannin and little or no unavailable ammonia I greatly improve its quality, and by eliminating the soluble tannin I render it possible to practically make all of the ammonia available.

Ordinary vegetable-tanned leather scraps—for instance, of sole-leather—have a composition approximately as follows: hide substance, forty-two and one-half per cent.; free tannin, sixteen per cent.; combined tannin, twenty-six and one-half per cent.; oil, three per cent.; moisture, ten per cent., and ash two per cent.; total, one hundred per cent.

Generally speaking, sole-leather of this composition contains about nine to ten per cent. of ammonia in an insoluble condition. I take the said leather scraps or, indeed, pieces of any vegetable-tanned hide substance containing both free tannin and combined tannin, say, in proportions approximating those above mentioned. These scraps I place in suitable vessels well known in the art as "tanks," "wash-drums," or "wash-wheels," and then wash or leach the scraps with water of about the temperature of 150° Fahrenheit, so as to extract or remove all traces of free uncombined soluble tannin. The resulting liquor is gathered in suitable vessels and then concentrated by means of vacuum evaporators into extracts, which are run into casks or other suitable receptacles, being then ready for the market. The remaining leather scraps are now free from all soluble or uncombined tannin. They are next placed in suitable tanks and boiling water is added. Into this boiling water is poured sulfuric acid of 66° Baumé in the approximate proportion of one hundred and forty pounds of the acid to each two thousand pounds of such leather or its equivalent, this proportion being reckoned upon the said leather considered as dry. The hot acid solution acting upon this leather or its equivalent decomposes it and dissolves it, so as to leave no residual solid substance. The resulting liquid is called "tank-water" or "ammoniacal" liquor, which may now be concentrated and dried and, if desired, may be ground to a suitable fineness.

The ammoniate so prepared is absolutely free from tannin and consequently is free from the universal objection heretofore urged against such ammoniates obtainable upon the market.

The ammoniate prepared as above described contains between nine and ten per cent. of ammonia, nearly all of which is in the so-called "available" form. Analysis has actually shown that as much as ninety-five per cent. of ammonia contained in this ammoniate is available, according to official Government methods.

It is a fact that sulfuric acid will act upon and decompose the so-called "combined" tannin—that is, upon compounds made by the union of tannin and organic substances—but it will not act upon the free or soluble tannin. Hence if the free, soluble, or uncombined tannin is not first removed it is impossible to produce an ammoniate free from tannin. So, also, if the free or soluble tannin is not first removed it is impossible to make the ammoniate contain more that seventy per cent. of its ammonia in an available form. The sulfuric acid will not act perfectly upon the insoluble nitrogenous compounds of the leather when any free tannic acid is present.

It will be noted from the above description that in removing the free uncombined soluble tannin from the leather or its equivalent, so as to render the latter completely available for the attack of the sulfuric acid, I do not waste the tannin thus removed, but work it into an article of commercial value—to wit, the tan extract. Just why sulfuric acid does not decompose free tannin is not generally understood. It is due, no doubt, in a measure to the wonderful resisting or preservative properties of the free tannin. I find in practice that the removal of the free tannin leaves the leather in a much more porous condition, so that the subsequent breaking up of the leather or its equivalent and of the acid used as a reactionary agent is not only rapid but more complete than would ordinarily be expected.

Having thus described my invention, I claim as new and desire to secure by Letters Patent—

1. The method herein described of treating vegetable-tanned leather substances, which consists in removing therefrom the free tannin, then subjecting the residual leather substances to the action of a solvent, and finally pulverizing the resulting leather-substance fertilizer.

2. The method herein described of treating vegetable-tanned leather substances, which consists in extracting the free tannin therein contained, and subjecting the residual portions of said leather substances to the action of sulfuric acid so as to dissolve them.

3. The method herein described of preparing an ammoniate fertilizer, which consists in removing the soluble tannin from vegetable-tanned leather substances, subjecting the residual leather substances to the action of sulfuric acid, and finally concentrating and drying the resulting ammoniacal liquor.

In testimony whereof I have signed my name to this specification in the presence of two subscribing witnesses.

EDWARD J. FUCHS.

Witnesses:
WALTON HARRISON,
JNO. M. RITTER.